United States Patent
Thompson

(10) Patent No.: US 10,153,628 B2
(45) Date of Patent: Dec. 11, 2018

(54) ELECTRICAL COMPONENT ENCLOSURE FOR RECESSING INTO AND FIXING TO A SURFACE

(71) Applicant: Electrix International Ltd, County Durham (GB)

(72) Inventor: Richard John Thompson, County Durham (GB)

(73) Assignee: ELECTRIX INTERNATIONAL LTD (GB)

( * ) Notice: Subject to any disclaimer, the term of this patent is extended or adjusted under 35 U.S.C. 154(b) by 0 days.

(21) Appl. No.: 15/217,210

(22) Filed: Jul. 22, 2016

(65) Prior Publication Data
US 2017/0104320 A1    Apr. 13, 2017

(30) Foreign Application Priority Data
Jul. 22, 2015    (GB) .................................. 1512970.3

(51) Int. Cl.
| | |
|---|---|
| *H02G 3/08* | (2006.01) |
| *H02G 3/12* | (2006.01) |
| *H01H 3/08* | (2006.01) |
| *H01H 3/12* | (2006.01) |
| *H02G 3/14* | (2006.01) |

(52) U.S. Cl.
CPC .............. *H02G 3/088* (2013.01); *H01H 3/08* (2013.01); *H01H 3/12* (2013.01); *H02G 3/081* (2013.01); *H02G 3/123* (2013.01); *H02G 3/14* (2013.01)

(58) Field of Classification Search
CPC ........... H02G 3/088; H02G 3/14; H02G 3/081
USPC ............................................. 174/50.5, 58, 50
See application file for complete search history.

(56) References Cited

U.S. PATENT DOCUMENTS

| | | | | |
|---|---|---|---|---|
| 5,450,221 | A * | 9/1995 | Owen ..................... | G01D 11/24 174/50 |
| 6,852,924 | B2 * | 2/2005 | Lessard ................ | H05K 9/0073 174/377 |
| 7,265,292 | B2 * | 9/2007 | Greenfield ............. | H02G 3/088 174/50 |

* cited by examiner

*Primary Examiner* — Dhirubhai R Patel
(74) *Attorney, Agent, or Firm* — The Belles Group, P.C.

(57) ABSTRACT

An enclosure for containing electrical components and for recessing into and fixing to a surface is disclosed. The enclosure has a box and a flange extending the box adjacent an opening in the box. The flange has an aperture in each corn to receive a fixing screw. A first seal extends around the box on a rear surface of the flange. A lid covers the opening and the flange and touches the first seal. A second seal extends around the opening and engages the lid and the body. Lid screws fix the lid to the body. The apparatus provides an easy to clean and completely sealed enclosure.

20 Claims, 6 Drawing Sheets

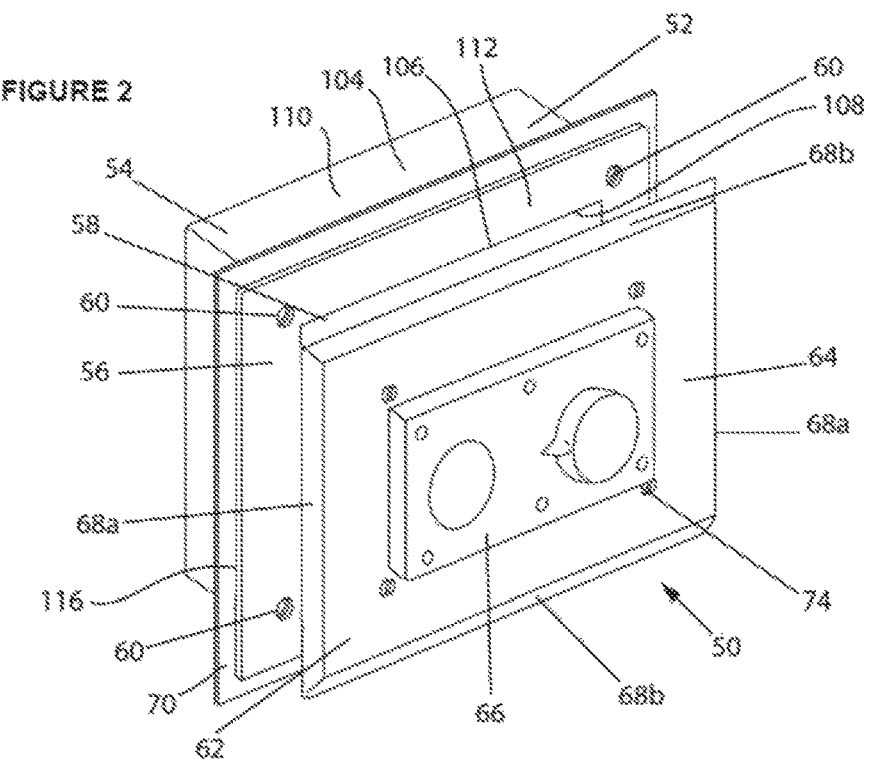
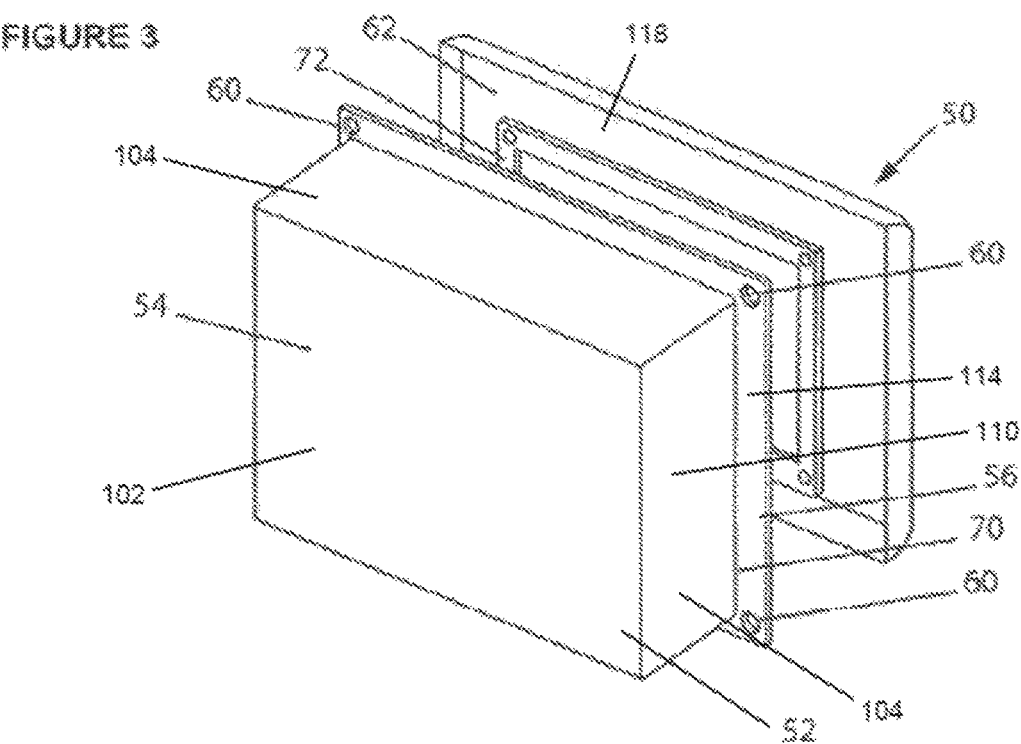

FIGURE 6
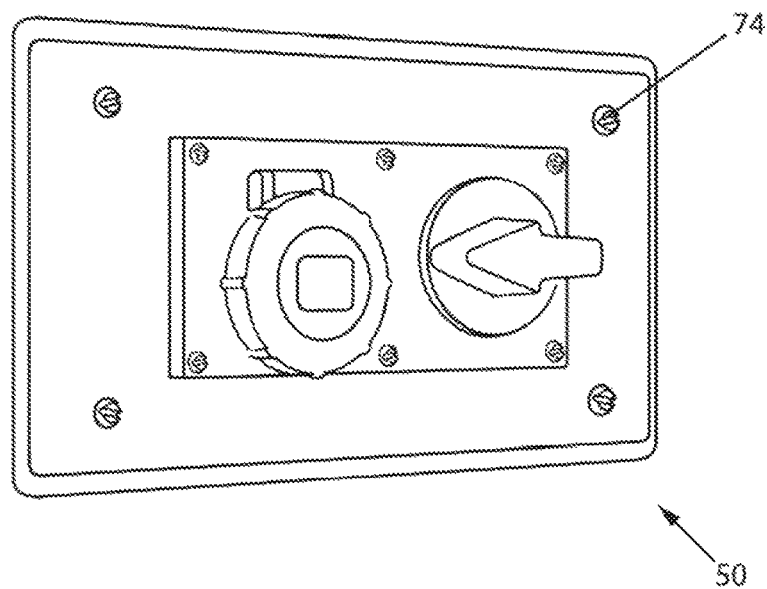
FIGURE 7     FIGURE 8     FIGURE 9
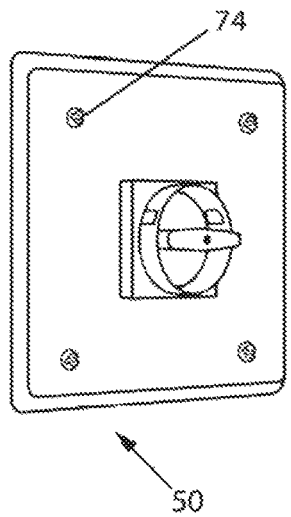 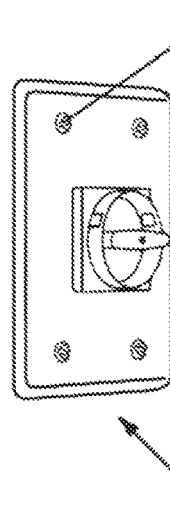 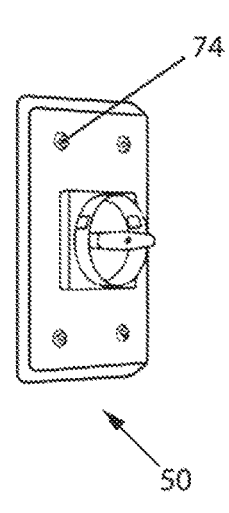

ELECTRICAL COMPONENT ENCLOSURE FOR RECESSING INTO AND FIXING TO A SURFACE

CROSS-REFERENCE TO RELATED APPLICATIONS

This application claims priority under 35 U.S.C. § 119 to United Kingdom Patent Application No. 1512970.3, filed Jul. 22, 2015, the entirety of which is hereby incorporated herein by reference.

FIELD OF THE INVENTION

The present invention relates to an electrical component enclosure and relates particularly, but not exclusively, to an enclosure for containing electrical components which is recessed and fixed to a wall.

BACKGROUND OF THE INVENTION

It is extremely commonplace for electrical components, such as switches, to be recessed into walls. In industrial premises where cleanliness is paramount, such as the food and beverage preparation and pharmaceutical industries, it is particularly important that all surfaces and switches are easily cleaned and more preferably provide a substantially waterproof seal protecting the electrical components within the enclosure from any engagement with water.

FIG. 1 shows an example of a waterproof enclosure of the prior art. The enclosure 10 is recessed into an opening 12 in a wall 14 covered with tiles 16 which are stuck to the wall 14 using a layer of adhesive 18. The enclosure 10 includes a metal box 20 which is entirely contained within the opening 12 and is generally fixed to a surface of the opening 12 by an adhesive or a screw (not shown) extending in to wall 14. The box 20 has a pair of lugs 22 which have threaded apertures to receive bolts 24. The bolts extend through a front plate 26 which carries a component such as a button switch 28. The bolts 24 pull the front plate 26 towards the metal box 20 and a bead of sealant 30 extends around the front plate 26, adjacent its perimeter, thereby sealing the enclosure relative to the wall in preventing water from entering the enclosure.

The installation of this enclosure 10 will only provide a waterproof seal if the bead of sealant 30 is correctly applied. A number of factors affect the quality of this seal including the quality of the bead of sealant applied by the installer, which is at least in part dependent upon the installer's experience. Furthermore, over tightening of the bolts 24 can lead to damage to the seal 30, distortion of the front plate 26 or dislodging of the box 20 from its fixing to wall 14 making the whole enclosure 10 vulnerable to removal from the opening 12. It is also the case that to the wall by the sealant. As a result, if a pulling force is applied to the enclosure it can become partially dislodged from the wall thereby damaging the seal. Furthermore, if the cover plate is removed, for example for inspection or maintenance, the sealant 30 must be completely removed from the front plate 26 and a new bead of sealant applied.

Preferred embodiments of the present invention seek to overcome the above described disadvantages of the prior art.

BRIEF SUMMARY OF THE INVENTION

According to an aspect of the present invention there is provided an enclosure for containing electrical components and for recessing into and fixing to a surface, the enclosure comprising: a body including a box defining a volume and having at least one open portion allowing access to said volume, the body also including a flange extending from said box adjacent said opening portion, said flange having a plurality of fixing apertures extending therethrough for receiving a fixing device to fix said enclosure to a surface with said box extending at least partially through said surface; a first seal extending around said box and engaging a first side of said flange and in use said surface; a lid for covering said opening, the lid having a substantially planar portion and edge portions extending over said flange and engaging said first seal; a second seal extending around said opening and engaging said lid and said body; and a lid fixing device for fixing said lid to said body and applying a compression force to said second seal.

By providing seals formed as part of the enclosure the advantage is provided that the quality of the seal, that is its capacity to prevent water ingress, is much less dependent on the experience and ability of the installer than enclosures of the prior art. Furthermore, the integrity of the seals can be tested for each enclosure prior to installation, that is during manufacture, thereby significantly reducing the likelihood of installer error leading to an unsealed enclosure. By having the edge portions of the lid engaging the first seal, the advantage is provided that the lid is sealed twice relative to the inside of the enclosure. As a result, the first seal, which is external to the formed enclosure and is contactable from the outside of the enclosure can be formed from a first sealing material and the second seal formed from a second sealing material. The first sealing material can meet requirements of being externally exposed, for example meeting certain regulatory authority standards, whilst the inner seal can have other properties providing a better seal.

Because the fixing device for fixing the enclosure to the wall, typically screws, are covered by the lid (because the lids covers the flange) the advantage is provided that if the holes formed into the walls are not quite precise, the fact that the screws extending into these holes may not fit perfectly with the flange does not matter since the flange is covered by the lid. If this were not the case, the incomplete engagement of the bolts with the flange could risk the creation of dirt traps which is undesirable in clean environments. Furthermore, in order to ensure a secure installation it is not uncommon for the box fixing device (the previously mentioned screws) to be damaged during installation by over tightening which can again lead to the creation of dirt traps. The only externally exposed fixings are the lid fixing device which do not need to be very tightly fitted to ensure therefore less likely to be damaged during installation.

In a preferred embodiment the opening is formed in a surface of said box, said surface forming a frame at least partially around said opening. This provides the advantage that the lid fixing device is able to extend into the frame and therefore contained within the volume of the enclosure.

In another preferred embodiment the lid fixing device comprises bolts extending into threaded openings.

In a further preferred embodiment the threaded openings are formed in said frame.

In a preferred embodiment the threaded opening comprises a recess not in communication with said volume. This ensures that there is no route of water ingress from the outside of the lid to the inside of the body of the enclosure. The enclosure may further comprise components and these components may in turn comprise switches. The second seal may be fixed to said lid. By fixing the second seal to the lid the advantage is provided that correct installation of the second seal is ensured and not left to the skill of the installer. The first seal preferably comprises a silicon rubber and the second seal preferably comprises neoprene.

BRIEF DESCRIPTION OF THE DRAWINGS

Preferred embodiments of the present invention will now be described, by way of example only, and not in any limitative sense with reference to the accompanying drawings in which:

FIGS. 2 and 3 are perspective views of an enclosure of the present invention prior to installation;

FIGS. 6 to 12 are a series of examples of installed enclosures of the present invention.

DETAILED DESCRIPTION OF THE INVENTION

Figure 1:
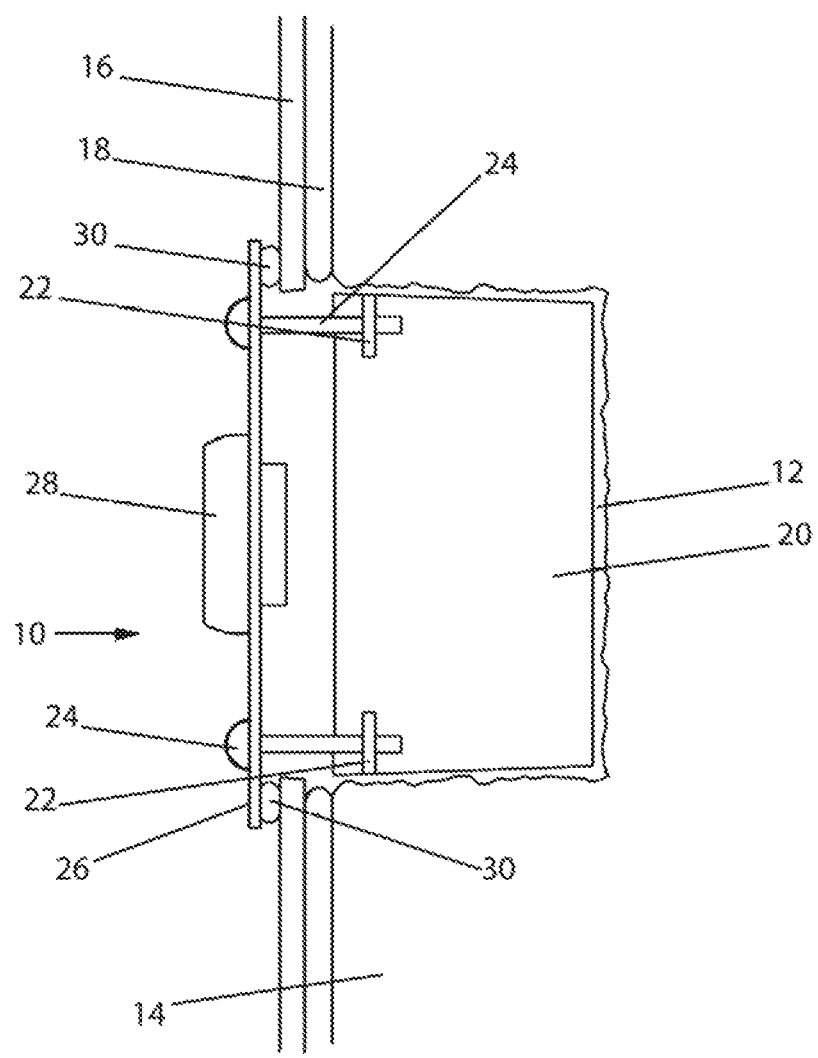
FIG. 1 is a sectional view of an enclosure of the prior art.
Figure 4:
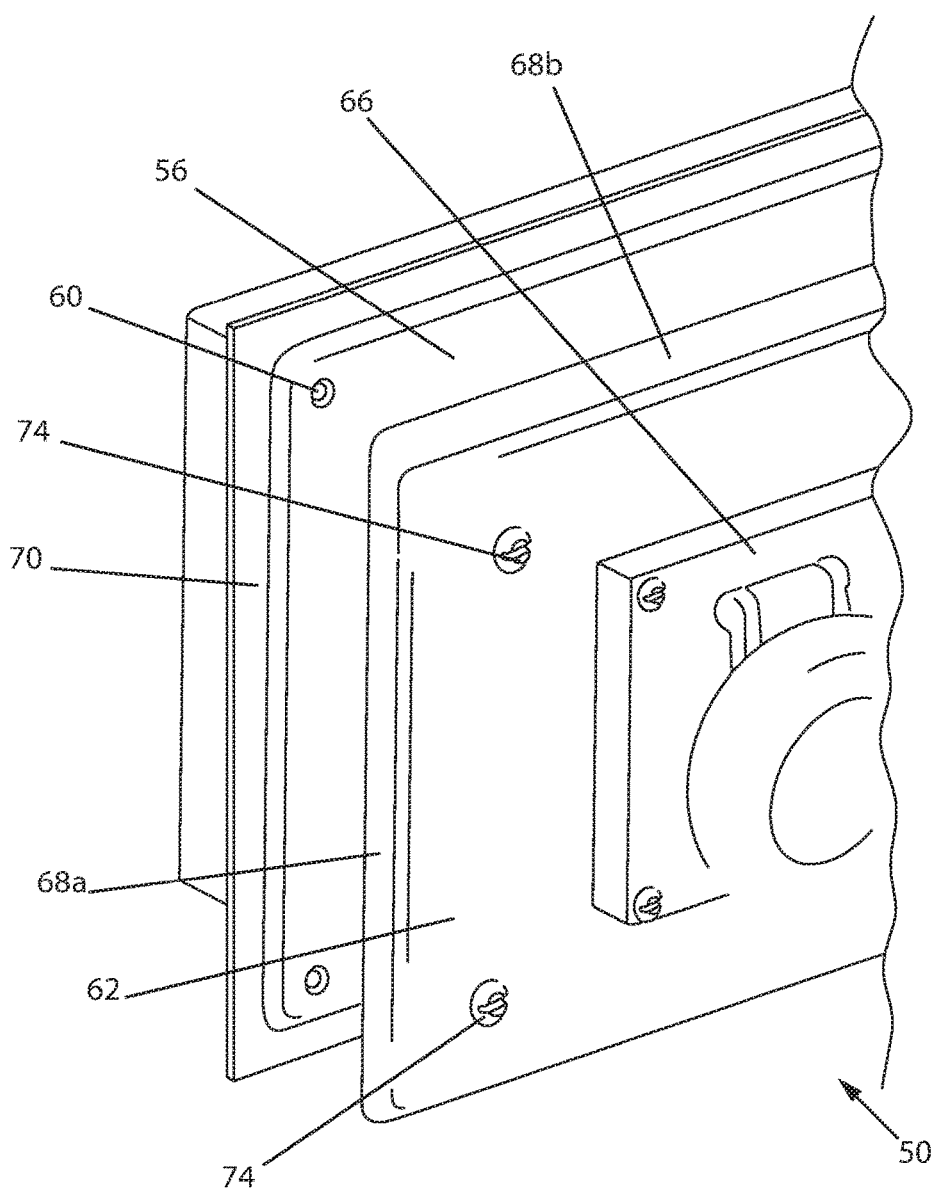
FIGS. 4 and 5 are perspective close up views of a portion of an another enclosure of the present invention prior to installation.
Figure 5:
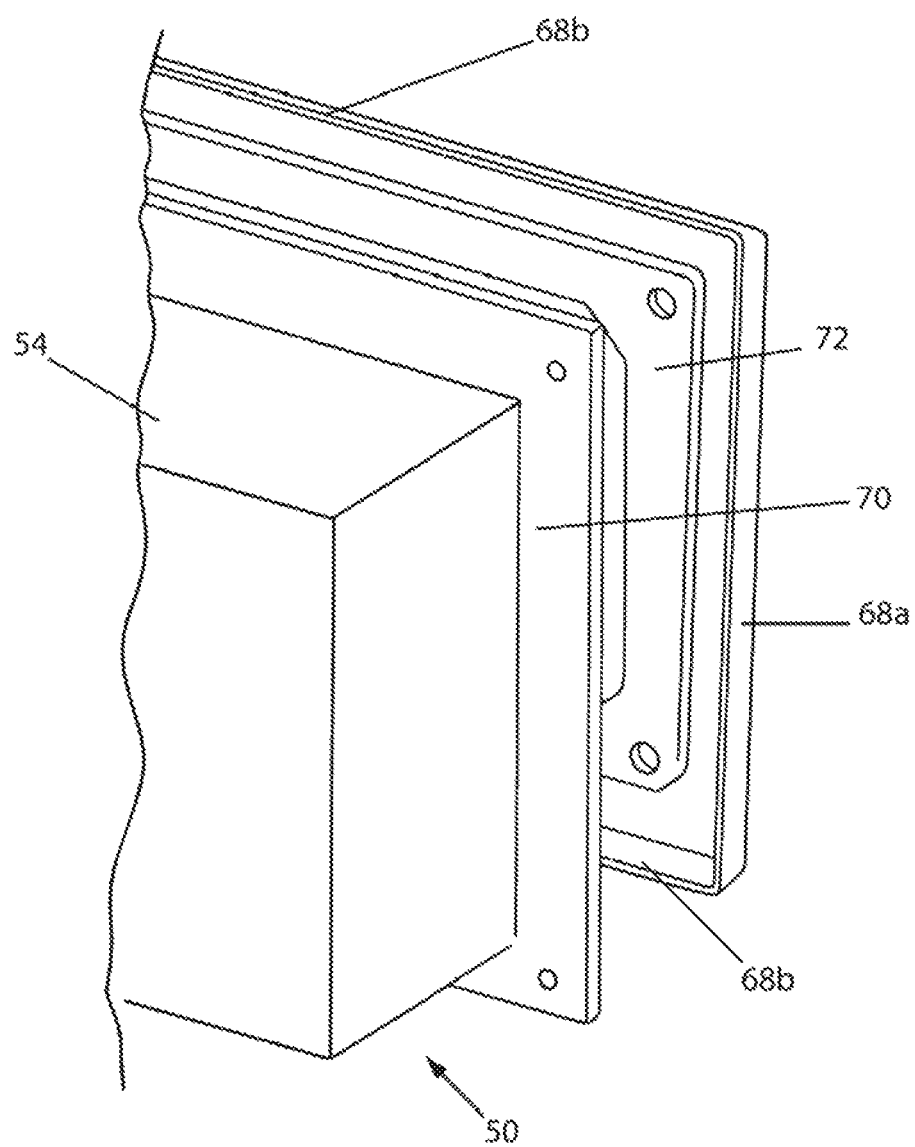
Figure 10:
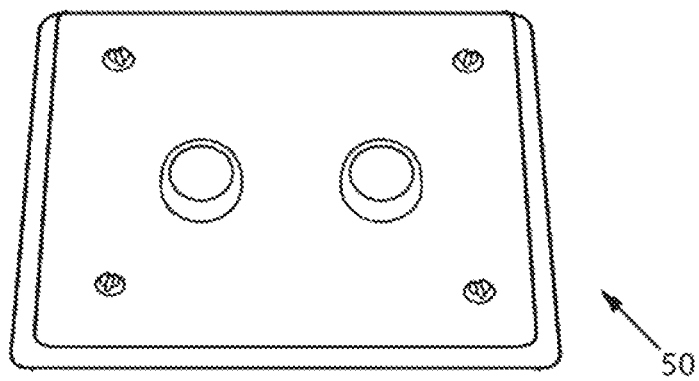
Figure 11:
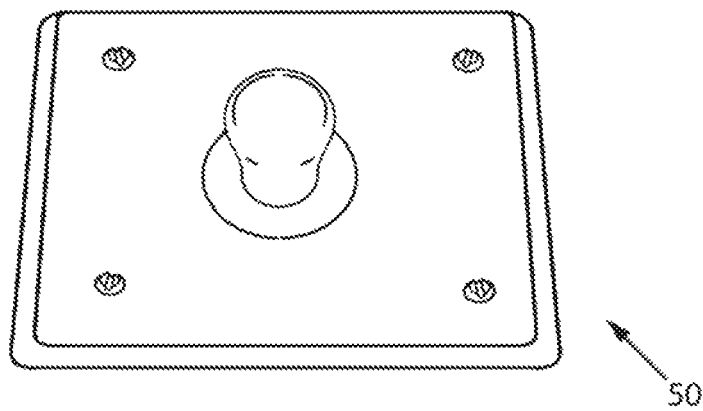

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring to FIGS. 2 to 12, an electrical enclosure 50 is provided for containing electrical components such as wires and cables, connectors, switches and the like. The enclosure is designed to be fixed to and recessed into a surface such as a wall. The enclosure 50 has a body, indicated generally at 52, which is formed from a box 54 and a flange 56. The box 54 comprises a rear wall 102 and one or more side walls 104 that extend from the rear wall 102 to a distal edge 106. Each of the one or more side walls 104 has an inner surface 108 and an outer surface 110. The flange 56 has a front surface 112, a rear surface 114 opposite the front surface 112, and a terminal edge 116 that extends between the front and rear surfaces 112, 114. The box shown in the embodiments in FIGS. 2 to 5 is a cuboid with an opening 58 in the face adjacent the flange 56. The opening 58 acts as an open portion allowing access to a volume defined by the internal surfaces of the faces of box 54. The flange 56 extends around the whole face of the box 54 which has opening 58 in it and therefore has dimensions greater than those of that face of box 54. For fixing apertures 60 in the corners of the flange 56 are provided so that a fixing device, in the form of fixing screws (not shown) can be used to fix the flange, and therefore the enclosure 50, to a wall or other surface.

The enclosure 50 also includes a lid 62 which is sized to be large enough to cover the face of box 54 with the opening 58 as well as covering the flange 56. The lid 62 has a substantially planar front surface 64 and a rear surface 118 opposite the front surface 64. In the embodiment shown in FIGS. 2 and 4, a component in the form of switching apparatus 66 is provided extending from the substantially planar front surface 64. Furthermore, the lid 62 includes edge portions 68 which extend transverse from the planar front surface 64 with the end edge portions 68a extending roughly perpendicular to the planar front surface 64 and the top and bottom edge portions 68b extending at roughly 45°, thereby preventing objects such as pens being left resting on the enclosure 50.

The enclosure 50 is provided with two seals. The first seal 70 extends around the box and engaging the flange 56. As a result the first seal 70 is shaped very similarly to the flange 56 and engages a reverse side of the flange, which is obscured from view in the drawings by the seal. When the enclosure 50 is in use the first seal 70 is pressed into engagement with the flange 56 and the surface of the wall into which the enclosure is fixed. The first purpose of the first seal is therefore to prevent water ingress into the cavity into which the enclosure has been fixed. It should be noted that the box 54 is watertight and would not allow any water in the cavity behind the box to enter the volume of the enclosure but it is still advantageous to ensure that no water enters the cavity as it may damage the cavity or may seep out of the cavity having been contaminated whilst in the cavity. The first seal is preferably made from a material which has good sealing and excellent hygiene properties such as a silicone rubber.

A second seal 72 is also provided and this extends around the opening 58 and engages both the lid 62 and the body 52. If the opening 58 is provided as a large aperture in a face of box 54 this will generally result in the remainder of that face forming a frame. It is therefore preferable that the second seal 72 extends around the opening 58 engaging this frame. As an alternative, the second seal 72 could extend around the opening 58 by engaging the flange 56 on the opposing surface to the surface engaging the first seal 70. To ensure that the second seal is in the correct position it is glued into engagement with the lid. Because the second seal 72 will not come into engagement with anything outside the enclosure its hygiene properties are not as significant as those of the first seal 70. As a result, the second seal can be formed from any suitable sealing material and neoprene is a good example as it has excellent sealing properties but its somewhat foam-like structure means that it is less suitable for use where hygiene is of paramount concern.

In order to fix the lid 62 to the body 52 a lid fixing device are provided. These are in the form of bolts 74 which fix into threaded apertures (not shown) which are formed in the frame extending around opening 58. These threaded apertures are preferably recesses which are not open into the volume of box 54 (that is they are not in communication with the volume of the box) and therefore in the unlikely event that water could, through capillary action, move around the thread of the bolts 74 it would be trapped in these recesses and could not enter the volume of the enclosure.

Figure 12:
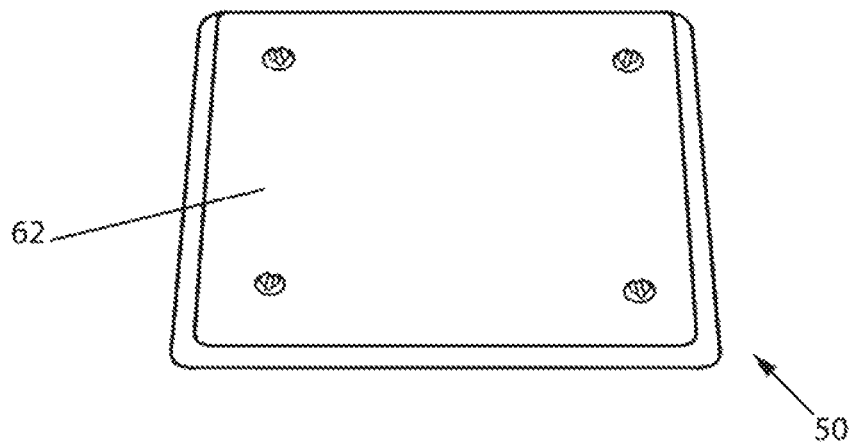

In the examples in FIGS. 6 to 11 various different forms of switch apparatus are shown. In FIG. 12 a blank enclosure is shown with no component extending through the lid 62.

Installation and operation of the enclosure 50 will now be described. For installation into a solid wall a recess is formed in the wall having dimension slightly larger than the box 54 so as to accommodate the box. If the enclosure 50 is being installed into a sheet material, such as plasterboard or a metal sheet material, and aperture is cut into the sheet material sized to receive the box 54 but smaller than the flange 56. Fixing holes are also formed into the surface onto which the enclosure 50 is to be installed and these are located using the aperture 60 in the flange.

If wires and or cables are two extend through the enclosure 50 these will typically be installed through aperture is cut into the box 54 and sealed using cable glands prior to installation.

The body 52 of enclosure 50 is brought into engagement with the aperture or recess in the wall such that the first seal 70 is engaged with the flange 56 and the surface of the wall and with the fixing apertures 60 aligned with the recently drilled holes in the wall surface. Screws are then used to fix the enclosure to the wall with the screws extending through the fixing apertures and into the holes in the wall, which will typically have retaining plugs placed therein. When enclosure 50 is being fixed to a sheet material specifically designed plugs may be used or other fixing device with legs to engage the inside of the sheet material may also be used. It does not matter if the screws extending through the fixing apertures 60 are damaged during installation or are not perfectly aligned leaving small dirt traps since they will be covered by the lid 62.

Once the body 52 is securely fixed to the wall the lid 62 can be introduced. Firstly, the cables can be connected to the switch 66 or other component forming part of the enclosure and then the lid 62 is brought into engagement with the body 52 so that the bolts 74 are aligned with the threaded recesses in the frame around the opening 58. The bolts 74 are then tightened which compresses the second seal 72 between the inner surface of lid 62 and the frame around the opening 56 in body 52. At the same time, the edge portions 68 of the lid 62 come into engagement with the first seal 70 as they extend around the periphery of the flange 56. This provides a second form of sealing for the first seal as it prevents water ingress into the space between the edge portion 68 of lid 62 and the second seal 72. Because this seal is between the edge portion 68 and the first seal 70 it may not be perfect, in particular if the surface of the wall in which the enclosure is engaged has imperfections. However, there will generally be two levels of sealing function between the exterior of the enclosure and the internal volume of the body the first being provided by the first seal 70 (which is also sealing the recess into which the enclosure is sat) and the second by the second seal 72. Because the bolts 74 extend into threaded apertures they do not need to be tightened with excessive force to provide sufficient sealing required and is therefore very unlikely that they will be damaged during installation.

It will be appreciated by persons skilled in the art that the above embodiments have been described by way of example only and not in any limitative sense, and that various alterations and modifications are possible without departure from the scope of the protection which is defined by the appended claims.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An enclosure for containing electrical components and for recessing into and fixing to a wall surface, the enclosure comprising:
    a body comprising:
        a box comprising a rear wall and one or more side walls extending from the rear wall to a distal edge, the distal edges of the one or more side walls defining an opening that provides access into a volume of said box defined by said rear wall and inner surfaces of said one or more side walls; and
        a flange extending from said one or more side walls of said box adjacent said opening and protruding from an outer surface of said one or more side walls, said flange having a front surface, a rear surface opposite said front surface, and a plurality of fixing apertures extending therethrough from said front surface to said rear surface, wherein said enclosure is fixed to said wall surface with said box extending at least partially through said wall surface;
    a first seal extending around said one or more side walls of said box and engaging said rear surface of said flange, wherein said first seal engages said wall surface when said enclosure is fixed to said wall surface;
    a lid covering said front surface of said flange and said opening, the lid having a substantially planar portion and edge portions extending over said flange, said edge portions contacting said first seal;
    a second seal extending around said opening and engaging said lid and said body; and
    a lid fixing device for fixing said lid to said body and applying a compression force to said second seal.

2. The enclosure according to claim 1, wherein said distal edge of said one or more side walls forms a frame that at least partially surrounds said opening.

3. The enclosure according to claim 2, wherein said lid fixing device comprises threaded bolts extending into threaded openings.

4. The enclosure according to claim 3, wherein said threaded openings are formed in said frame.

5. The enclosure according to claim 4, wherein each of said threaded openings comprises a recess not in communication with said volume of said box.

6. The enclosure according to claim 1, wherein said lid further comprises components.

7. The enclosure according to claim 6, wherein said components comprise switches.

8. The enclosure according to claim 1, wherein said second seal is fixed to said lid.

9. The enclosure according to claim 1, wherein said second seal comprises neoprene.

10. The enclosure according to claim 1, wherein said first seal comprises silicone rubber.

11. An enclosure for containing electrical components and for recessing into and fixing to a wall surface, the enclosure comprising:
    a body comprising:

a box comprising a rear wall and one or more side walls having inner and outer surfaces extending from the rear wall to a distal edge, the rear wall and the inner surfaces of the one or more side walls collectively defining a volume, the distal edges of the one or more side walls defining an opening that provides access into the volume; and a flange protruding radially from the outer surface of the one or more side walls at said distal edges of said one or more side walls, said flange having a front surface, a rear surface opposite said front surface, and a terminal edge extending between the front and rear surfaces;

a first seal located on said rear surface of said flange;

a second seal located on said front surface of said flange; and a lid covering said front surface of said flange and said opening, said lid and said flange directly contacting both said first seal and said second seal.

12. The enclosure according to claim 11 wherein said first seal surrounds said second seal in a spaced apart manner.

13. The enclosure according to claim 11 further comprising a lid fixing device for fixing said lid to said body and applying a compression force to said second seal.

14. The enclosure according to claim 11 wherein said first seal is configured to be pressed into engagement with said wall surface within which the enclosure is fixed.

15. An enclosure for containing electrical components and for recessing into and fixing to a wall surface, the enclosure comprising:

a body comprising:

a box comprising a rear wall and one or more side walls extending from the rear wall to a distal edge, the rear wall and the one or more side walls collectively defining a volume, the distal edges of the one or more side walls defining an opening that provides access into the volume; and a flange extending from said one or more side walls adjacent said distal ends of said one or more side walls so as to overhang said side walls in a direction away from said opening, said flange having a front surface, a rear surface opposite said front surface, and a terminal edge extending between the front and rear surfaces;

a first seal located on said rear surface of said flange, a portion of said first seal extending beyond said terminal edge of said flange;

a lid having a front surface and an opposite rear surface, a second seal fixed to the rear surface of said lid; and wherein said lid is coupled to said body so that said lid covers said front surface of said flange and said opening, said second seal is compressed directly between said lid and said body, and edge portions of said lid contact said portion of said first seal.

16. The enclosure according to claim 15 wherein the first seal surrounds the second seal.

17. The enclosure according to claim 15 further comprising a lid fixing device for fixing said lid to said body and applying a compression force to said second seal.

18. The enclosure according to claim 15 wherein said first seal is configured to be pressed into engagement with said wall surface having a recess within which the enclosure is at least partially disposed.

19. The enclosure according to claim 15 wherein the first seal is formed of a first material and the second seal is formed of a second material, the first and second materials being different from one another.

20. The enclosure according to claim 19 wherein the first seal is formed of silicone rubber and the second seal is formed of neoprene.

* * * * *